A. MÜLLNER.
APPARATUS FOR PROJECTING CINEMATOGRAPHIC VIEWS.
APPLICATION FILED MAY 19, 1913.
1,159,981.
Patented Nov. 9, 1915.
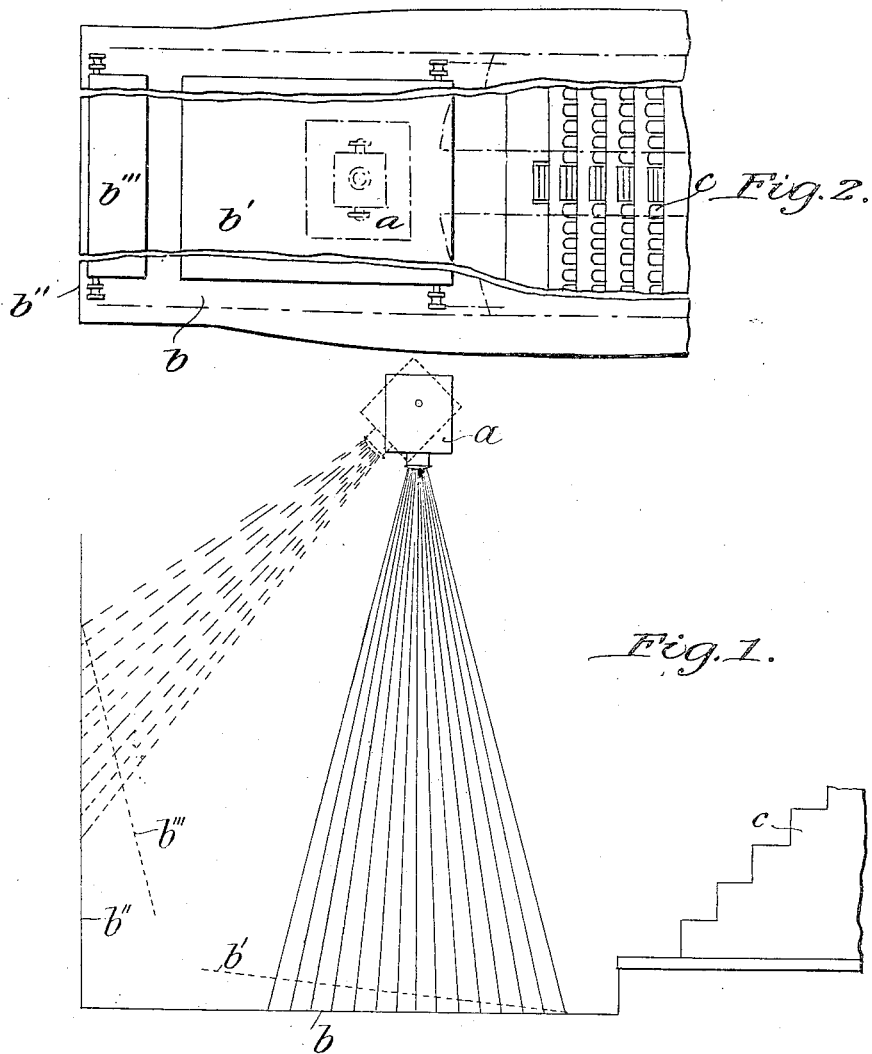

UNITED STATES PATENT OFFICE.

ANTON MÜLLNER, OF VIENNA, AUSTRIA-HUNGARY, ASSIGNOR OF ONE-HALF TO HEINRICH REINHARDT, OF VIENNA, AUSTRIA-HUNGARY.

APPARATUS FOR PROJECTING CINEMATOGRAPHIC VIEWS.

1,159,981.   Specification of Letters Patent.   Patented Nov. 9, 1915.

Application filed May 19, 1913. Serial No. 768,594.

*To all whom it may concern:*

Be it known that I, ANTON MÜLLNER, subject of the Emperor of Austria-Hungary, residing at Tivoligasse 51, Vienna, XII, in the Province of Lower Austria and Empire of Austria-Hungary, have invented certain new and useful Improvements in Apparatus for Projecting Cinematographic Views; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention consists in the combination of a horizontal plane of projection with a usual vertical plane of projection for the purpose of supplementing, by means of one and the same projecting apparatus, representations of bird's-eye views together with reproductions of usual views.

The invention consists therefore in a combination of two planes and one projecting device. As an example the following may be stated: The auditory room may have the form of an aeroplane, in which the rows of seats are arranged amphitheatrically, for the purpose that by suitable projection upon a horizontal plane the spectator imagines to ascend and to fly over the projected country. In order to increase the illusion suitable looped, curved and slide flights may be made. After the imagined landing the projection is made upon a vertical plane and certain events or performances may be represented now, for example, at first flight to Stockholm to the Olympic games, then reproduction of the same etc. The said combination also has great importance concerning popular education, for the reason that the natural succession of geographical, and historical representations may be made one directly after the other. A country may be shown in a bird's-eye view and thence different parts of it, as buildings, statues, etc., may be shown on the vertical plane.

In order to carry out the projection in vertical as well as in horizontal direction the apparatus is capable of turning.

In the drawing:—Figure 1 is a diagrammatic view illustrating the invention. Fig. 2 is a plan view.

$a$ is the projecting apparatus, by means of which bird's-eye views can be projected upon a bottom plane $b$ looked upon from above. The plane of projection $b$ is capable to be turned, so that the images may appear as the case may be also upon a plane $b'$ inclined in relation to the horizontal plane. The spectators occupy seats $c$ which ascend amphitheatrically.

The apparatus $a$ can be rocked, so that representations or views obtained in usual manner may be projected corresponding to natural conditions upon a vertical plane $b''$. The latter may also be capable of turning, so that the representations or views may also be reproduced, if desired, upon a plane $b'''$ inclined toward the vertical plane.

Claims.

1. In an apparatus for projecting cinematographic views, the combination with two projecting screens one horizontal and the other vertical, of a single projection device, the horizontal and vertical projecting screens mounted on horizontal pivots around which they are movable, the said projection device revoluble whereby views may be alternately thrown on the horizontal and vertical projecting screens for the purpose described.

2. A cinematographic mechanism comprising a horizontal projecting screen in front of and below a spectator's seat, the said projecting screen mounted upon a horizontal pivot, a vertical projecting screen in front of the said horizontal projecting screen and mounted upon a horizontal pivot, and a projection device revoluble and adapted to produce views alternately on the horizontal and vertical projecting screens, the parts arranged as and for the purpose described.

In testimony whereof I have signed my name to this specification in the presence of two subscribing witnesses.

ANTON MÜLLNER.

Witnesses:
SIGMUND BAUER,
AUGUST FUGGER.